US005086980A

United States Patent [19]

Hickey

[11] Patent Number: 5,086,980

[45] Date of Patent: Feb. 11, 1992

[54] FUEL INJECTOR FOR AN INTERNAL COMBUSTION ENGINE

[75] Inventor: John C. Hickey, Ypsilanti, Mich.

[73] Assignee: Ford Motor Company, Dearborn, Mich.

[21] Appl. No.: 594,752

[22] Filed: Oct. 9, 1990

[51] Int. Cl.[5] ...................... F02M 51/00; F16K 31/02

[52] U.S. Cl. ............................... 239/585; 251/129.15; 251/129.21

[58] Field of Search ................... 239/585; 251/129.15, 251/129.17, 129.2, 129.21

[56] References Cited

U.S. PATENT DOCUMENTS 2,881,980 4/1959 Beck et al. .
3,751,001 8/1973 Rayment .
3,963,644 6/1976 Eckert .
4,390,130 6/1983 Linssen et al. ...................... 239/585
4,418,886 12/1983 Holzer .
4,572,436 2/1986 Stettner et al. ..................... 239/585
4,763,635 8/1988 Ballhause et al. .
4,815,129 5/1985 Stettner .............................. 239/585
4,958,774 9/1990 Taylor ................................ 239/585

*Primary Examiner*—Andres Kashnikow
*Assistant Examiner*—Karen B. Merritt
*Attorney, Agent, or Firm*—Jerome R. Drouillard; Clifford L. Sadler

[57] ABSTRACT

A fuel injector for an internal combustion engine includes a housing for receiving liquid fuel and having a terminal provision for connecting the injector to an engine control computer, a solenoid coil operatively connected with the terminal provision, an orifice plate containing at least one orifice for discharging fuel from the injector, and a valve element positioned to cooperate with the orifice plate and to control the flow of fuel from the injector, with the valve element comprising a generally planar first segment which is immovable with respect to the injector housing and a second segment cantilevered from the first segment and having an armature attached thereto so that fuel will be allowed to flow from the injector when the injector solenoid coil is excited.

12 Claims, 2 Drawing Sheets

FUEL INJECTOR FOR AN INTERNAL COMBUSTION ENGINE

BACKGROUND OF THE INVENTION

1. Field of the Invention

The present invention relates to an injector for providing fuel to one or more cylinders of an internal combustion engine.

2. Disclosure Information

Electromagnetically driven fuel injectors have been widely used in automotive internal combustion engines for many years. Such injectors typically rely upon an axially extending needle valve which is slidably mounted within the injector and which reciprocates each time the injector fires so as to meter the desired amount of fuel into the engine's cylinder or intake manifold. Conventional injectors can be quite noisy during operation. A more worrisome aspect of the conventional injector arises from the fact that alcohol blend fuels finding increasing acceptance in the marketplace are likely to attack such sliding surfaces, leaving behind corrosion which could impair the operation of the injector. Accordingly, it is one aspect of the present invention that an injector made according to this invention will not rely upon the sliding action of a needle to meter the desired amount of fuel and, as a result, such injector will be better able to withstand the effects of corrosion resulting from hostile fuels.

U.S. Pat. No. 2,881,980 to Beck et al. and U.S. Pat. No. 4,515,129 to Stettner disclose electromagnetically driven automotive fuel injectors in which the metering elements comprise relatively massive discs which must be reciprocated electromagnetically in order to meter the desired amount of fuel. Each of these injectors would be expected to suffer from inferior time response characteristics arising from the magnitude of the reciprocating masses.

U.S. Pat. No. 3,961,644 to Eckert and U.S. Pat. No. 4,763,635 to Ballhause et al. each disclose electromagnetically driven valves for use in automotive fuel systems. The '644 patent discloses a valve having a circular membrane clamped about its periphery and having a center section which contacts a valve seat. The valve disclosed in the '635 patent is intended to control the flow of vapors from an evaporative emission control system into the intake of an engine and includes a leaf spring with an attached armature, with the armature coming into sealing contact with the valve seat. Neither of these valves includes a flow control element having the degree of freedom and, hence, the time response characteristics, of an injector according to the present invention.

U.S. Pat. No. 3,751,001 to Rayment and U.S. Pat. No. 4,418,886 to Holzer disclose other types of electromagnetically operated valves which are not suitable for the high speed operation required of an internal combustion engine fuel injector. The '001 patent discloses a valve having a rotating disc which is moved into and out of sealing contact with a slot formed in one end of the valve housing. The '886 patent discloses a pilot valve operated device. Neither of these designs is practical for use in an engine fuel injector.

It is an object of the present invention to provide a fuel injector for an internal combustion engine having reduced operating noise as compared to conventional needle type injectors.

It is yet another object of the present invention to provide a fuel injector for an internal combustion engine having superior sealing characteristics to prevent after-injection, which may cause undesirable increases in engine exhaust emissions.

It is yet another object of the present invention to provide a fuel injector for an internal combustion engine having improved response time.

It is still another object of the present invention to provide a fuel injector for an internal combustion engine which is highly resistant to the corrosive effects of alcohol blended fuels.

It is an advantage of the present invention that an injector according to this invention may be manufactured with relative ease and at low cost.

Other objects, features and advantages of the present invention will become apparent to those reading this specification.

DESCRIPTION OF THE PREFERRED EMBODIMENTS

Figure 1:
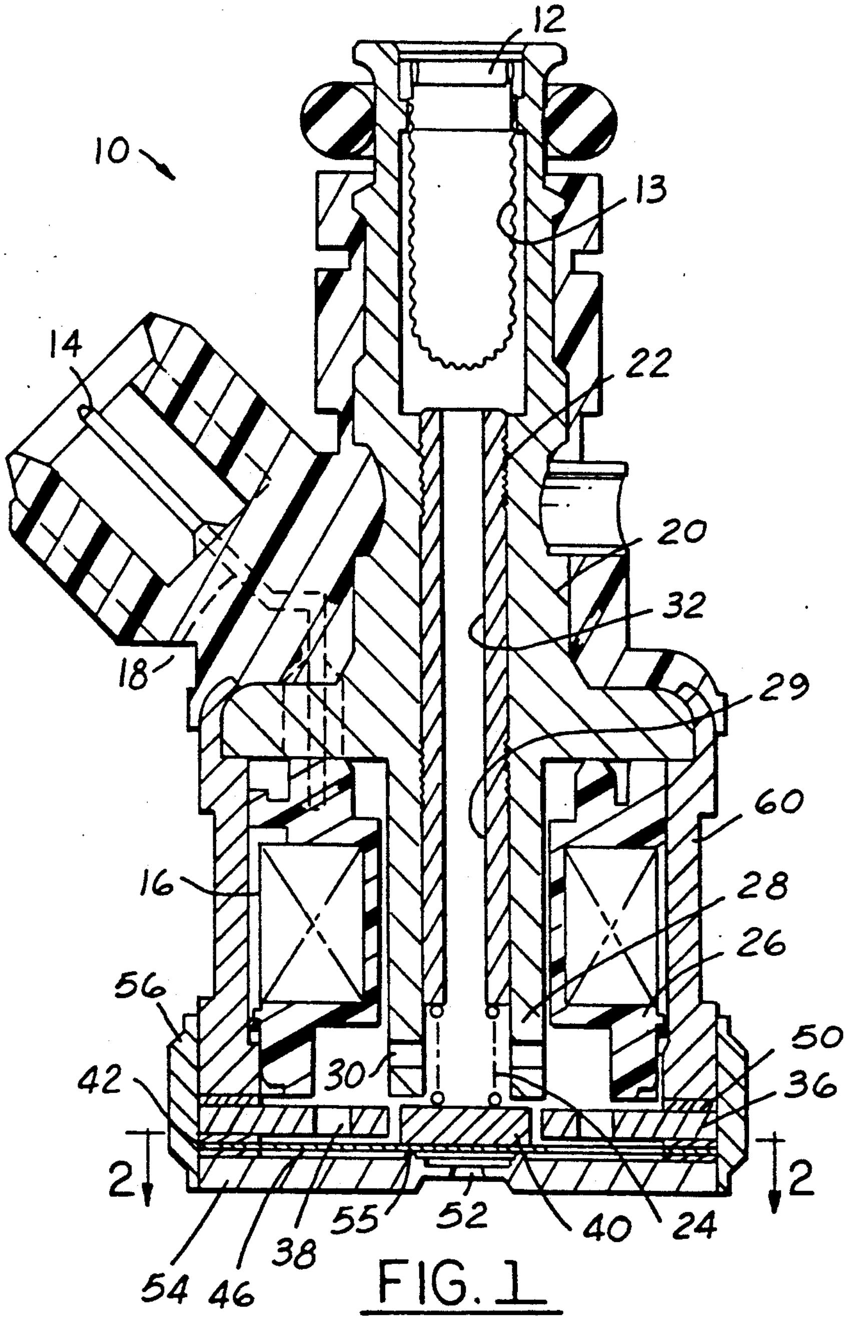
FIG. 1 is a longitudinal cross-section of an injector according to the present invention, shown in the closed position.
Figure 3:
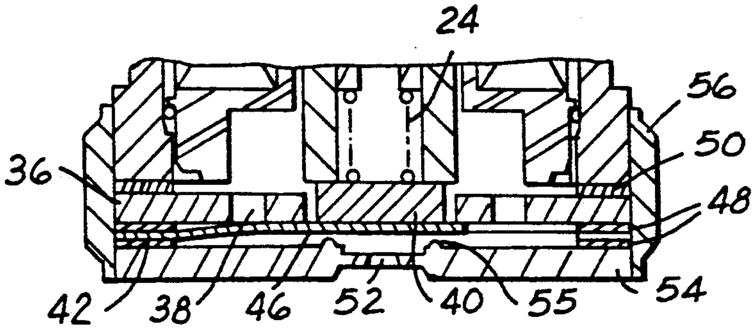
FIG. 3 is a partial cross-section similar to FIG. 1, showing an injector of the present invention in the open position.

As shown in FIG. 1, a fuel injector, 10, for an internal combustion engine according to the present invention has a housing which is adapted for receiving liquid fuel therein and which has a terminal provision for connecting the injector to an engine control computer. Accordingly, inlet port 12 at the top of the injector is equipped with filter 13 and provides a connector for attaching a fuel rail to the injector for supplying the injector with liquid fuel. Fuel entering the injector at inlet port 12 moves downwardly through closing spring adjuster 22, which has bore 32 contained therein. Bore 32 is coaxial with the axial centerline of the injector. Closing spring adjuster 22 is contained within inlet section 20 of the injector. Fuel moving through bore 32 eventually passes radially outward through fuel outflow ports 30 formed within the lower part of inlet section 20. Fuel then passes downwardly through ports 38 found in flux guide 36. In the event that the injector is in the open position, as is shown in FIG. 3, fuel then flows past reed 46, which comprises a segment of generally planar valve body 42, and then out through orifice 52 which is formed in orifice plate 54. Those skilled in the art will appreciate in view of this disclosure that orifice plate 54 could have not only the single orifice shown at 52 in FIG. 3, but also a plurality of orifices according to the demands of the engine being supplied with fuel by an injector according to the present invention.

The electromagnetic aspects of the present invention allow an injector according to this invention to be employed with high speed engines operated by digital electronic microprocessor computers. Accordingly, terminal 14, located at the outside of housing 10, connected by means of lead 18 to solenoid coil 16, allows an interconnection with an engine control computer (not shown). Solenoid coil 16 is wound about plastic bobbin 26. Upon being energized by the engine control computer, magnetic flux builds up and is conducted by flux guide 36, which is positioned at the bottom of the injector immediately above planar valve body 42. The magnetic flux then impinges upon armature 40 and drives reed 46 to an open position against the force of closing spring 24. As shown in FIG. 1, closing spring 24 is positioned between closing spring adjuster 22 and the uppermost surface of armature 40. The injector depicted in the Figures is normally closed because spring 24 will maintain reed 46 in a closed position against orifice plate 54 unless and until the voltage is applied to terminal 14 to excite coil 16. Inasmuch as reed 46 and armature 40 have relatively less mass than do the needle and armature of conventional injectors, the time response characteristics of the present injector are expected to be very favorable.

Closing spring adjuster 22 is employed for the purpose of compressing closing spring 24 to produce a predetermined static clamp load upon armature 40. This load is set during assembly of the injector by first assembling the bulk of the injector's components and by then pressing the closing spring adjuster axially downward until the desired flow rate is obtained, followed by crimping inlet section 20 about the outer diameter of the closing spring adjuster. Alternatively, the design of the valve elements in this injector will allow operation without closing spring 24 because the spring force developed by reed 46 and the hydraulic force developed by the pressure of fuel acting upon the reed will be sufficient to close the injector. Thus, inclusion of a closing spring is optional with the present injector.

FIG. 3 shows the normally open position of reed 46. Note that the reed is in the maximum open position, in which the top of the reed is in contact with the lower surface of flux guide 36. FIG. 3 further shows seat 55, which is formed integrally with orifice plate 54. Those skilled in the art will appreciate in view of this disclosure that other types of seat configurations could be employed for sealing reed 46 to orifice plate 54.

Figure 2:
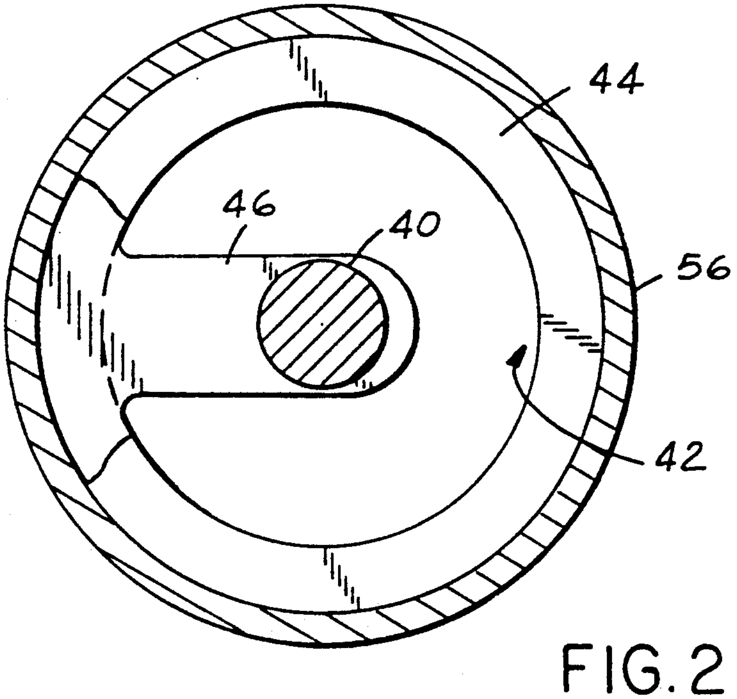
FIG. 2 is a plan view of a reed valve comprising a portion of an injector according to the present invention, taken along the line of 2—2 of FIG. 1.
Figure 4:
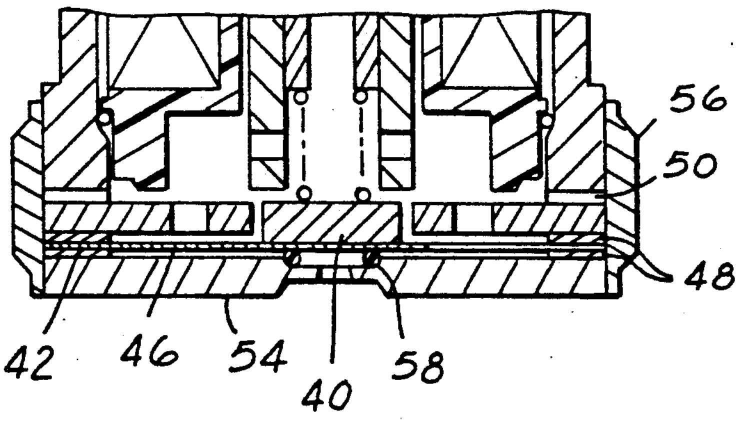
FIG. 4 is a partial cross-section similar to FIG. 1, but showing an elastomeric output seal according to an embodiment of the present invention.

FIGS. 3 and 4 show one manner in which the stroke of an injector according to the present invention may be set. Beginning first, however, with FIG. 2, note that reed 46 is cantilevered from annular land 44 of planar valve body 42, with the reed extending inwardly past the axial centerline of the injector. Because reed 46 is attached to, and indeed, integral with, planar valve body 42 only at one end of the reed, reed 46 has considerable freedom to move up and down, and to thereby move into and out of sealing contact with orifice plate 54. Those skilled in the art will appreciate in view of this disclosure that reed 46 could be attached to, and integral with, other types of base structures in addition to the annular structure illustrated in FIG. 2.

The extent to which reed 46 can move up and down and thereby, the total extent of its stroke, is determined by stroke spacers 48, which are shown with particularity in FIGS. 3 and 4. A first stroke spacer 48 is superimposed upon orifice plate 54. Planar valve body 42 follows next, with a second stroke spacer 48 being superimposed upon the planar valve body. Accordingly, the total installed height of the two stroke spacers 48, minus the height of seat 55, determines the maximum stroke to which reed 46 can be lifted off its static superposition upon orifice 52 and orifice plate 54 because once reed 46 has moved such distance, further travel of the Plate will be restricted by contact of the top surface of reed 46 with the lower surface of flux guide 36. It should be clear from this description that the annular land segment, 44, of planar valve body 42 is fixed immovably with respect to the lower housing, 60, of the injector, whereas the reed segment, 46, is free to move coaxially with the centerline of the injector.

The components located within the lower part of the injector, such as air gap spacer 50, which determines the minimum clearance between the upper surface of armature 40 and the lower surface of upper housing 20, and the previously described pack consisting of flux guide 36, stroke spacers 48, valve body 42 and orifice plate 54, are all maintained in their desired locations within the injector by means of assembly ring 56, which is preferably welded or crimped to orifice plate 54 and to lower housing 60. Alternatively, the assembly ring may be eliminated if lower housing 60 is enlarged in diameter and length so that the air gap spacer, flux guide, valve body, orifice plate, and adjacent components are housed telescopically within the lower housing.

FIG. 4 illustrates a second embodiment of the present invention in which elastomeric seal 58 is provided in orifice plate 54 for the purpose of sealing reed 46 to the orifice plate. Those skilled in the art will appreciate in view of this disclosure that an elastomeric seal can comprise various types of rubber compounds, such as rubber sold under the trademark Florez, or other types of elastomers. Alternatively, it will be appreciated that seal 58 could comprise yet other types of metallic or non-metallic materials known to those skilled in the art and suggested by this disclosure.

Those skilled in the art will appreciate in view of this disclosure that an injector according to the Present invention will be cost effective to manufacture due to the fact that only flat grinding operations are required with respect to the orifice plate and the planar valve body. Thus, the need for expensive lift grinding of a needle and valve body has been eliminated. It will be further appreciated that an injector according to this invention will be less likely to leak and thereby cause after-injections than known injectors because the flat locus of contact between reed 46 and orifice plate 54 is easily produced with a high degree of integrity.

Variations and modifications of the present invention are possible without departing from its spirit and scope as defined by the appended claims.

I claim:

1. A fuel injector for an internal combustion engine, comprising:

a housing adapted for receiving liquid fuel therein and having a terminal provision for connecting said injector to an engine control computer;

a solenoid coil operatively connected with said terminal provision;

an orifice plate containing at least one orifice for discharging fuel from said injector;

a valve element positioned to cooperate with said orifice plate to control the flow of fuel from said orifice, with said valve element comprising a generally planar valve body comprising a reed spring having a first segment immovable with respect to said housing and a second segment movably cantilevered from said first segment, and an armature attached to the second segment so that fuel is allowed to flow when said coil is excited; and elastic means for urging said second segment into contact with said orifice so that said injector is normally in a closed position.

2. A fuel injector according to claim 1, wherein said generally planar valve body comprises a unitary structure.

3. A fuel injector according to claim 1, wherein said first segment comprises an annular land rigidly attached to said housing and said second segment comprises a reed extending radially inwardly from said land, such that said reed is superimposed upon said orifice.

4. A fuel injector according to claim 1, wherein said elastic means comprises a spring interposed between an abutment enclosed within said housing and said armature.

5. A fuel injector according to claim 1, further comprising an elastomeric seal interposed between said orifice plate and said second segment.

6. A fuel injector for an internal combustion engine, comprising:

a housing adapted for receiving liquid fuel therein and having a terminal provision for connecting said injector to an engine control computer;

a solenoid coil situated within said housing and operatively connected with said terminal provision;

an orifice plate mounted at one end of said housing and containing at least one orifice for discharging fuel from said injector;

a valve element positioned within said housing to cooperate with said orifice plate to control the flow of fuel from said orifice, with said valve element comprising a generally planar unitary structure having a first annular land segment fixed immovably with respect to said housing and a second segment movably cantilevered from said first segment and superimposed upon said orifice plate, with said valve element further comprising an armature attached to the second segment so that fuel is allowed to flow when said coil is excited; and elastic means for urging said second segment into contact with said orifice plate so that said injector is normally in a closed position.

7. A fuel injector according to claim 6, wherein said generally planar valve structure comprises a reed spring.

8. A fuel injector according to claim 6, wherein said second segment comprises a reed extending radially inwardly from said annular land.

9. A fuel injector according to claim 8, wherein said armature is attached to the radially innermost portion of said reed.

10. A fuel injector according to claim 9, wherein said innermost portion of said reed extends radially inwardly past the axial centerline of said injector.

11. A fuel injector according to claim 8, further comprising an elastomeric seal interposed between said orifice plate and said second segment.

12. A fuel injector according to claim 6, wherein said elastic means comprises a spring interposed between an abutment enclosed within said housing and said armature.

* * * * *